United States Patent
Bowman (10) Patent No.: US 9,842,344 B2
(45) Date of Patent: Dec. 12, 2017

(54) SYSTEM AND METHOD FOR SHAREHOLDER INVESTMENT

(71) Applicant: Glenn A. Bowman, Viera, FL (US)

(72) Inventor: Glenn A. Bowman, Viera, FL (US)

(73) Assignee: Glenn A. Bowman, Viera, FL (US)

( * ) Notice: Subject to any disclaimer, the term of this patent is extended or adjusted under 35 U.S.C. 154(b) by 515 days.

(21) Appl. No.: 14/505,353

(22) Filed: Oct. 2, 2014

(65) Prior Publication Data

US 2016/0098739 A1   Apr. 7, 2016

(51) Int. Cl.
  *G06Q 30/02*   (2012.01)
  *G06Q 40/06*   (2012.01)

(52) U.S. Cl.
  CPC ..... *G06Q 30/0216* (2013.01); *G06Q 30/0226* (2013.01); *G06Q 40/06* (2013.01)

(58) Field of Classification Search
  CPC .................................................. G06Q 30/0216
  USPC .......................................................... 705/14
  See application file for complete search history.

(56) References Cited

U.S. PATENT DOCUMENTS

| | | | | |
|---|---|---|---|---|
| 6,631,358 B1 * | 10/2003 | Ogilvie | .................. | G06Q 10/10 705/35 |
| 8,131,590 B1 * | 3/2012 | Armstrong | ......... | G06Q 30/0208 705/14.11 |
| 2001/0047295 A1 * | 11/2001 | Tenembaum | .......... | G06Q 30/02 705/14.39 |
| 2002/0052818 A1 * | 5/2002 | Loveland | ............... | G06Q 40/04 705/36 R |
| 2003/0004803 A1 * | 1/2003 | Glover | ................... | G06Q 30/02 705/14.18 |
| 2003/0004809 A1 * | 1/2003 | Palcic | ..................... | G06Q 30/02 705/14.18 |
| 2004/0210505 A1 * | 10/2004 | Pourhamid | ............ | G06Q 30/02 705/37 |
| 2004/0254873 A1 * | 12/2004 | Loveland | ............... | G06Q 30/02 705/36 R |
| 2005/0055272 A1 * | 3/2005 | Ryan | ...................... | G06Q 20/10 705/14.13 |
| 2005/0209916 A1 * | 9/2005 | Longman | ............... | G06Q 30/02 705/14.18 |
| 2007/0106581 A1 * | 5/2007 | Mitchell | ................. | G06Q 30/02 705/35 |
| 2007/0192198 A1 * | 8/2007 | Schwarz | ................. | G06Q 30/02 705/26.1 |

(Continued)

*Primary Examiner* — Matthew L Hamilton
(74) *Attorney, Agent, or Firm* — Glenn A. Bowman (57) ABSTRACT

A shareholder investment system and method is provided. At least certain embodiments relate to processing of loyalty rewards such as rewards generated via the use of credit cards, debit cards, prepaid cards, etc. A payment processing system for financial transactions is enhanced to support reward transactions. The reward communications can be processed over the payment processing system together with payment transactions. Consumer's can accumulate monetary value associated with the rewards in a rewards account. The rewards are based on awards provided by conducting transactions using a rewards account associated with a shareholder rewards program or by conducting transactions with particular merchants participating in the rewards program. The accumulated monetary value can then be used for purchase of shares of stock of participating merchants.

22 Claims, 8 Drawing Sheets

(56) References Cited

U.S. PATENT DOCUMENTS

| | | | |
|---|---|---|---|
| 2007/0208624 A1* | 9/2007 | Gallagher | G06Q 20/06 705/14.18 |
| 2007/0265950 A1* | 11/2007 | Reuss | G06Q 40/00 705/36 R |
| 2008/0033816 A1* | 2/2008 | Miller | G06Q 30/02 705/14.18 |
| 2008/0201230 A1* | 8/2008 | Hardison | G06Q 30/0234 705/14.34 |
| 2009/0265263 A1* | 10/2009 | Williams | G06Q 40/06 705/37 |
| 2010/0106578 A1* | 4/2010 | Allio | G06Q 30/02 705/14.15 |
| 2011/0087532 A1* | 4/2011 | Garner | G06Q 30/00 705/14.18 |
| 2012/0203608 A1* | 8/2012 | Lele | G06Q 30/00 705/14.18 |

\* cited by examiner

SYSTEM AND METHOD FOR SHAREHOLDER INVESTMENT

FIELD OF THE INVENTION

At least certain embodiments of the invention disclosed herein relate generally to financial services transactions, and more particularly to a stock-based value added services system and method for payment card transactions.

BACKGROUND OF THE INVENTION

There are several marketing efforts related to offering incentives to promote certain customer spending behaviors. For example, a merchant may offer a loyalty program to provide rewards, such as a discount, rebate, or gift, to encourage customers to purchase from the merchant. A credit or debit card account issuer may offer a loyalty program to encourage cardholders to use the credit card from the issuer. Merchants may also integrate their own loyalty programs with a credit or debit card issuer to cooperate to offer loyalty programs to promote their respective services and products. For example, some payment card issuers have allowed or promoted the consolidation of rewards earned through customer relationships, such as hotels, airlines, oil companies, etc. These rewards are typically limited to purchases made using the payment cards from the respective account issuers. The amounts of the rewards are calculated based on the total purchase price charged to the payment card accounts. To consolidate rewards, payment card issuers or their associated merchant partners in the loyalty program may exchange information about the rewards.

Loyalty programs generally maintain an account for each customer to accumulate benefits earned by the customer in connection with activities related to the loyalty program. For instance, rewards are credited to a reward account of a consumer after the consumer performs certain actions that satisfy the rules of the loyalty program, such as by making a purchase using a particular payment credit or debit card from the account issuer providing the loyalty program or by making a purchase from a specific merchant or group of merchants sponsoring the loyalty program. Rewards can be quantified in various units, such as actual cash value, points, miles, stars, digital cash, etc.

SUMMARY

A shareholder investment system and method is provided. At least certain embodiments relate to processing of loyalty rewards such as rewards generated via the use of credit cards, debit cards, prepaid cards, etc. A payment processing system for financial transactions is enhanced to support reward transactions. The reward communications can be processed over the payment processing system together with payment transactions. Consumer's can accumulate monetary value associated with the rewards in a rewards account. The rewards are based on awards provided by conducting transactions using a rewards account associated with a shareholder rewards program or by conducting transactions with particular merchants participating in the rewards program. The accumulated monetary value can then be used for purchase of shares of stock of participating merchants.

BRIEF DESCRIPTION OF THE DRAWINGS

For a better understanding of at least certain embodiments, reference will be made to the following Detailed Description, which is to be read in conjunction with the accompanying drawings, wherein.

DETAILED DESCRIPTION

Throughout the description, for the purposes of explanation, numerous specific details are set forth in order to provide a thorough understanding of the present invention. It will be apparent to one skilled in the art, however, that the present invention may be practiced without some of these specific details. In other instances, well-known structures and devices are shown in block diagram form to avoid obscuring the underlying principles of embodiments of the invention. The embodiments described herein include a method and system for shareholder investment.

I. Exemplary Systems

Provided below is a description of an example system in which embodiments provided herein may be implemented. Although certain of the entities may be depicted as separate components, in some instances one or more of the components may be combined into a single device or system. Similarly, although certain functionality may be described as being performed by a single entity or component within the system, the functionality may, in some instances, be performed by multiple components or entities acting in a coordinated fashion. Communications between entities and components may comprise the exchange of data or information using electronic messages on any suitable electronic communication medium as understood by persons of skill in the art.

Figure 1:
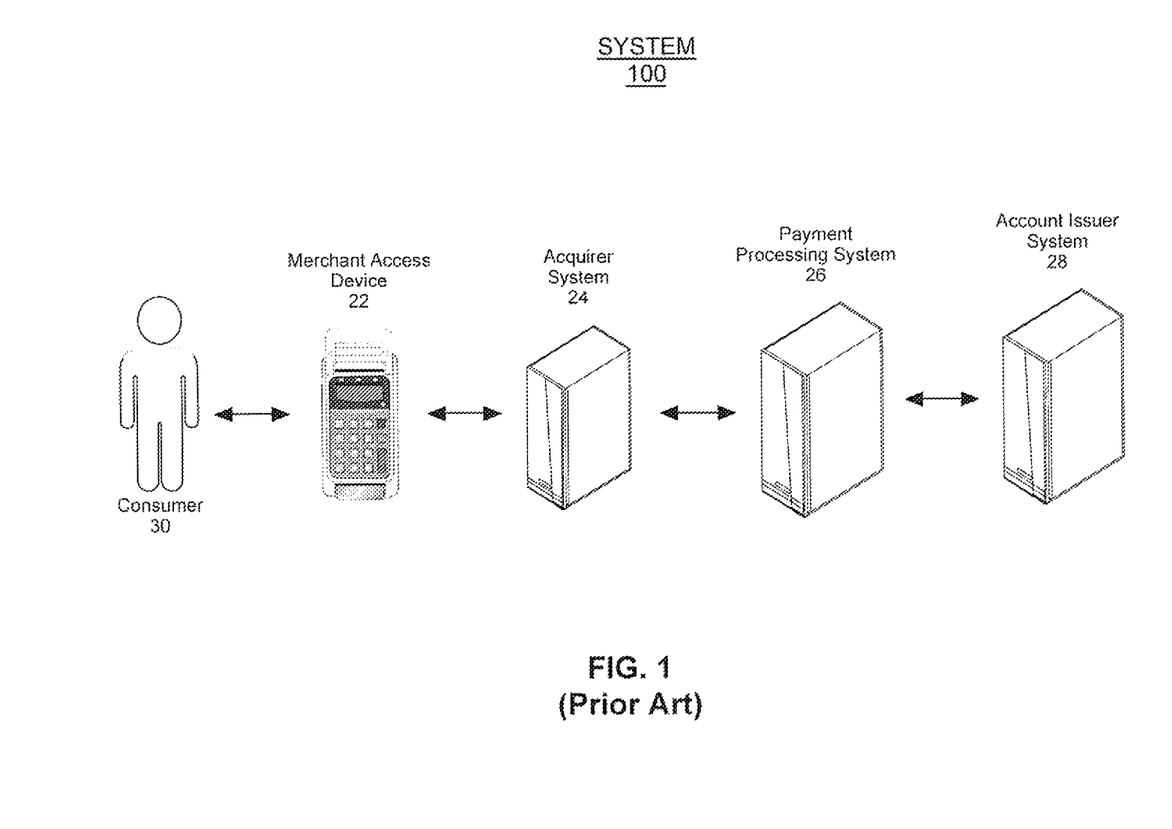
FIG. 1 depicts an example block diagram of a typical payment card transaction processing system according to the prior art.

FIG. 1 depicts an example block diagram of a typical payment card transaction processing system according to the prior art. In a typical purchase transaction, a consumer 30 uses a consumer payment device such as a credit card, debit, card, prepaid card, etc., to purchase goods or services from a merchant by interacting with at the merchant's access device 22. A mobile phone or other electronic device can also be used as a payment device using, for example, near-field communications ("NFC") as is known in the art. In addition, the merchant access device 22 can be in any suitable form such as point of sale ("POS") device or terminal, cellular phone, PDA, personal computer, server computer, tablet, handheld specialized reader, electronic cash register, automated teller machine (ATM), virtual cash register, kiosk, etc.

In the most common case, a POS device is used. A POS device is generally an electronic device where a transaction is completed and any suitable terminal may be used. It is the point at which a consumer 30 makes a payment to the merchant in exchange for goods or services. At the POS the merchant device 22 calculates the total amount owed by the consumer and provides options for payment. The merchant will also normally issue a receipt for the transaction. In many cases, POS devices 22 include card readers. Card readers may include any suitable contact or contactless mode of operation. For example, card readers may include magnetic stripe readers, RF antennas, NFC readers, etc. Alternatively, the access device 22 may interact with the consumer 30 remotely in an online purchase over a network such as the Internet.

In addition, POS devices in various industries may include customized hardware and software. Retailers may utilize weighing scales, scanners, electronic and manual cash registers, EFTPOS terminals, touch screens, or any other of a wide variety of hardware and software available for use with POS devices. For example, a grocery or candy store may use a scale at the point of sale, while bars and restaurants may use software to customize the item or service sold when a customer has a special meal or drink request. Modern POS devices may include advanced features to cater to different functionality, such as inventory management, CRM, financials, warehousing, etc., all built into the POS software.

FIG. 1 shows a system 100 that includes a merchant access device 22 in communication with an acquirer system 24 associated with the merchant 22. An acquiring bank (or "acquirer") is a bank or financial institution that processes credit or debit card payments on behalf of merchants. The term acquirer indicates that the bank accepts or acquires credit card payments from the card-issuing banks (or "account issuers"). In a typical payment transaction, a consumer 30 may purchase goods or services at the merchant access device 22 using a consumer payment device. The acquirer system 24 then communicates with an account issuer 28 of the consumer's account for authorization via a payment processing system 26. The best-known payment processing systems 26 include Visa, MasterCard, Discover, and American Express.

The payment processing system 26 may include any data processing subsystems, networks, or operations used to support and deliver payment authorization services, exception file services, and/or clearing and settlement services. Exemplary payment processors include systems capable of processing credit card transactions, debit card transactions, and other types of commercial transactions, as well as performing clearing and settlement services. A clearing process is a process of exchanging financial details between an acquirer system and an account issuer to facilitate posting the transaction to the consumer's account and reconciliation of the consumer's settlement position. Clearing denotes all activities from the time a commitment is made for a transaction until the transaction is settled. Clearing payments is necessary to the promise of payment into the actual movement of money from one bank to another. Clearing and settlement can occur simultaneously.

The payment processing system 26 may include a server computer as is well known in the art. A server computer is typically a powerful computer or cluster of computers. For example, the server computer can be a large mainframe, a minicomputer cluster, or a group of servers functioning in cooperation as a unit. In one example, the server computer may be a database server coupled to a web server. The payment processing system 26 may use any suitable wired or wireless network, including the Internet. For the purposes of the proposed methods, the acquirer system 24, payment processing system 26, and issuer system 28 can each individually act as a service provider. They can also act as a single service provider by working together in any combination. The consumer 30 may be an individual or an organization such as a business that is capable of purchasing goods or services.

In a typical purchase transaction, the consumer 30 purchases a good or service at the merchant access device 22 using a consumer payment device. The consumer's payment device can interact with an access device 22 such as a POS terminal 22 at the merchant. An "authorization request message" is then generated at the merchant access device 22 and forwarded to the acquirer system 24. As used herein the term "authorization request message" refers to any electronic message that is sent over a payment processing network or to an account issuer to request authorization for a particular transaction. An authorization request message according to some embodiments may comply with an International Organization for Standardization ("ISO"). For example, an authorization request message may comply with ISO 8583, which is a standard message format for systems that exchange electronic transaction information associated with a payment using a payment device or payment account. The authorization request message may include an issuer account number (or other account identifier) that may be associated with the consumer's payment device. An authorization request message may also include additional data elements of identification information including, by way of example, a service code, a card verification value ("CVV"), an expiration date, etc. An authorization request message may also include any information associated with a current transaction, such as the amount, merchant identifier, merchant location, etc., as well as any other information that may be utilized in determining whether to identify or authorize the transaction.

After receiving the authorization request message, the authorization request message is then sent to the payment processing system 26, which then forwards it to the account issuer system 28 of the consumer payment device for authorization. In such an embodiment, the consumer's account information is stored at the account issuer 28 and is checked for authorization. In other embodiments, the payment processor 26 may also have access to the consumer's account information locally and can authorize transactions on behalf of the account issuer system 28.

After the issuer system 28 receives the authorization request message, the issuer 28 sends an "authorization response message" back to the payment processing system 26 to indicate whether or not the current transaction is authorized. An "authorization response message" may be any electronic reply message to an authorization request message generated by an issuing financial institution or payment processing network. The authorization response message may include, for example, one or more of the following: (1) transaction approved; (2) transaction declined; or (3) response pending more information. The authorization response message may also include an authorization code, which may be a code that a credit card issuing bank returns in response to an authorization request message (either directly or through the payment processing network)

to a merchant's access device 22 that indicates approval or disapproval of the transaction. The code may serve as proof of authorization. In some embodiments, the payment processing network may generate or forward the authorization response message to the merchant.

The transaction processing system 26 then forwards the authorization response message back to the acquirer system 24, which then forwards the response message back to the merchant access device 22. After the merchant 22 receives the authorization response message, the access device 22 at the merchant may then provide the authorization response message for the consumer 30. The response message may be displayed by the POS terminal, or may be printed out on a receipt, etc. At the end of the day, a normal clearing and settlement process can be conducted by the payment processing system 26.

Figure 2:
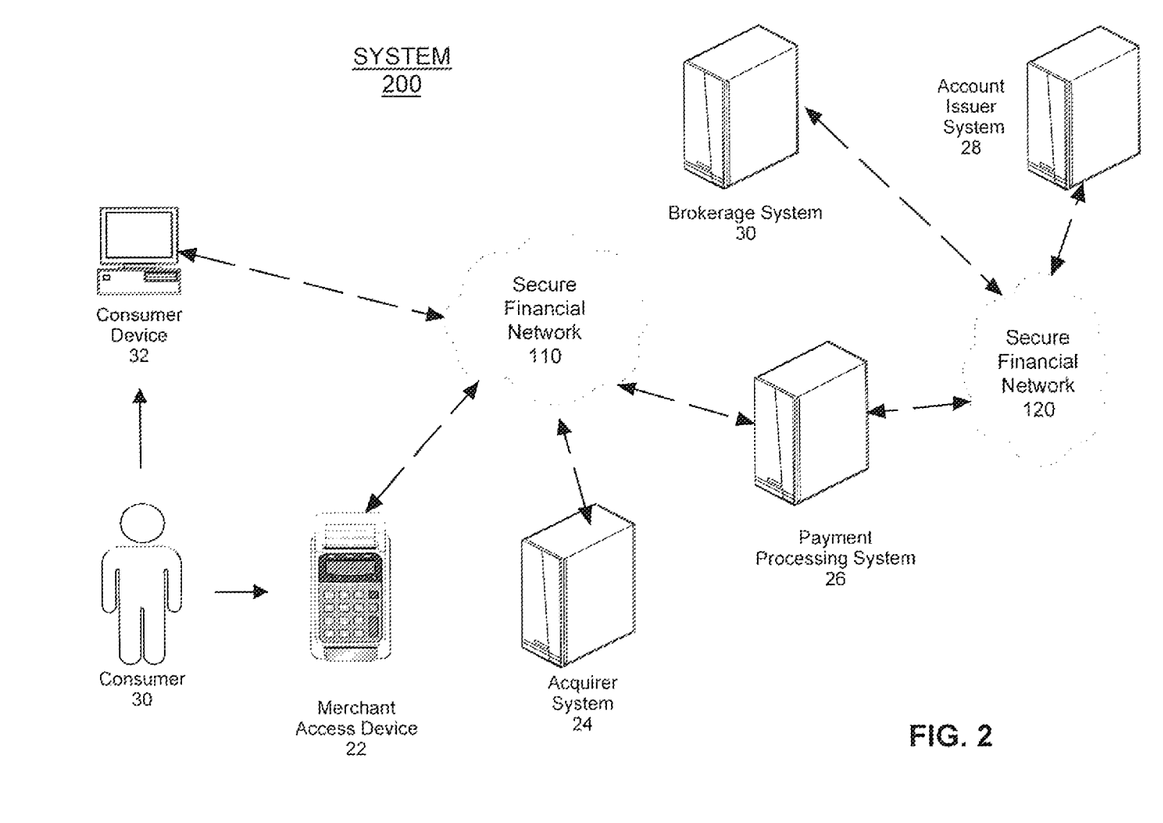
FIG. 2 is a block diagram depicting an example embodiment of a system configured to implement a payment card shareholder's rewards program.

FIG. 2 is a block diagram depicting an example embodiment of a system configured to implement a payment card shareholder's rewards program. As depicted, system 200 includes a consumer 30, a consumer device 32, a merchant access device 22, an acquirer system 24, a payment processing system 26, an account issuer system 28, and a brokerage system 30, as well as one or more secure financial networks 110 and 120. As discussed previously, consumer 30 can conduct a transaction using a payment device such as a credit or debit card by interacting with a merchant access device 22. Alternatively, the consumer 30 can conduct an online transaction over one or more secure financial networks 110 using a device 32 such as a computer connected to the Internet.

Acquirer system 24 can communicate with the merchant access device 22 and payment processing system 26 over the one or more secure financial networks 110. Further, payment processing system 26 can communicate with the account issuer system 28 and a brokerage system 30 over one or more secure financial networks 120. As described in detail below, system 200 can be used to facilitate transactions and can implement a shareholder rewards program according to the embodiments described herein. At least certain embodiments relate to processing of loyalty rewards such as rewards generated via the use of credit cards, debit cards, prepaid cards, etc. A payment processing system 26 for financial transactions is enhanced to support reward transactions. The reward communications can be processed over the payment processing system 26 together with payment transactions. Consumer's 30 can accumulate monetary value associated with the rewards in a rewards account. The rewards are based on awards provided by conducting transactions using a rewards account associated with a shareholder rewards program or by conducting transactions with particular merchants 22 participating in the rewards program. The accumulated monetary value can then be used for purchase of shares of stock of participating merchants 22.

Figure 3:
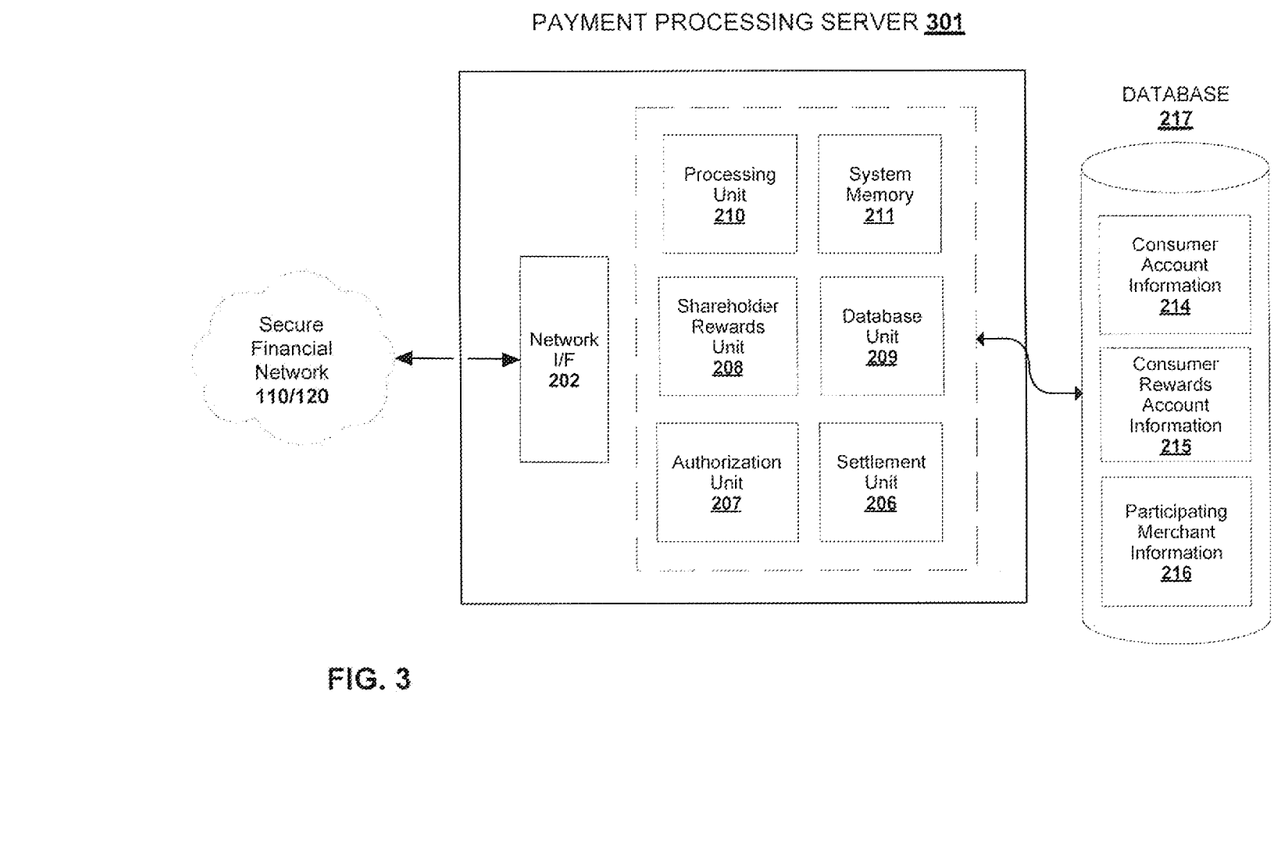
FIG. 3 is a block diagram depicting an example embodiment of a payment processing system configured to implement a payment card shareholder's rewards program.

FIG. 3 is a block diagram depicting an example embodiment of a payment processing system configured to implement a payment card shareholder's rewards program. Payment processing server 301 is illustrated as including a plurality of hardware and software units or modules; however, it should be appreciated that such is for illustration purposes only as each of the units or modules and their associated functionality may be performed by any number of different components. Payment processing server 301 may perform the relevant functions and operations described herein with reference through use of any suitable combination of software instructions and hardware configurations.

In the illustrated embodiment, payment processing server 301 includes a network interface (I/F) unit 202 in communication with one or more secure financial networks. Payment processing server 301 is shown as including a processor 210 and a system memory 211 (which may comprise any combination of volatile or non-volatile memory such as RAM, DRAM, ROM, flash, or any other suitable memory). In addition, payment processing server is shown as including one or more units or modules 206, 207, 208, and 209. These units may be disposed within one or more of the components of the system memory 211, or may be externally located. They may be implemented in hardware, software, or any combination of hardware and software elements. The processing unit 210 and system memory 211 may be used in conjunction with all or any number of these units as described below to provide the desired functionality. Moreover although many of the data processing functions and features of some embodiments may be physically located in the payment processing server 301, it should be understood that such functions and features could be present in other components such as the issuer system 28, and need not be specifically located in the payment processing server 26.

Payment processing server 301 includes a database unit 209 configured to communicate and manage a database 217. As shown in the illustrated embodiment, database 217 includes consumer account information 214, consumer rewards account information 215, and participating merchant information 216. Consumer account information 214 for accounts issued by issuer system 28 can be stored locally in database 217 and used to implement the techniques described herein. Further, the rewards account information 215 associated with each consumer's shareholder rewards account can be stored in database 217. Participating merchant information 216 can also be stored in database 217. Merchants that agree to participate in the shareholder rewards program can register with the service. Accounts can be created for these merchants that contain certain information specific to the merchant. For example, the name of the merchant, and type of goods or services the merchant provides can be included in the merchant information 216. In addition, the details of the merchant's participation can also be stored in 216. For instance, when a merchant accepts a payment card transaction, the merchant will typically pay a transaction fee to the payment processor for providing this service. The merchant participating in the shareholder rewards program may pay an additional percentage of the transaction fee for participating in the shareholder rewards program. Alternatively, the merchant may elect to offer to pay a higher percentage of the transaction fee as part of a sales incentive for attracting program participants to shop at the merchant's stores or to receive services offered by the merchant.

In one embodiment, database is a remote database in communication with the payment processing server 301 over one or more networks. In other embodiments, database 217 can be a local database integrated with the payment processing server 310. In yet other embodiments, this information is stored in system memory 211 of the payment processing server 301 and no database is used or necessary.

Payment processing server 301 further includes a shareholder rewards unit 208. Shareholder rewards unit 208 may be implemented in dedicated computer hardware, software, or any combination of computer hardware and software elements. In at least certain embodiments, the shareholder rewards unit 208 is configured to implement embodiments of the shareholder investment method and system described herein. Consumers can register for the shareholders rewards account offered in a shareholder rewards program for payment transactions as described herein. Registered users' account information can then be associated with a corresponding shareholder rewards account. When a transaction is performed by a consumer using a payment device (e.g., credit or debit card or mobile device) that is associated with a registered rewards account, the shareholder rewards unit 208 can be configured to capture the consumer's payment account information in the authorization request message and to identify the consumer's account 214 as being associated with a shareholders rewards account 215. The shareholders rewards unit 208 is configured to then credit a shareholder fee ("SF") to the consumer's shareholder rewards account 215 based on the transaction conducted by the consumer as described in detail below.

II. Exemplary Methods

Figure 4A:
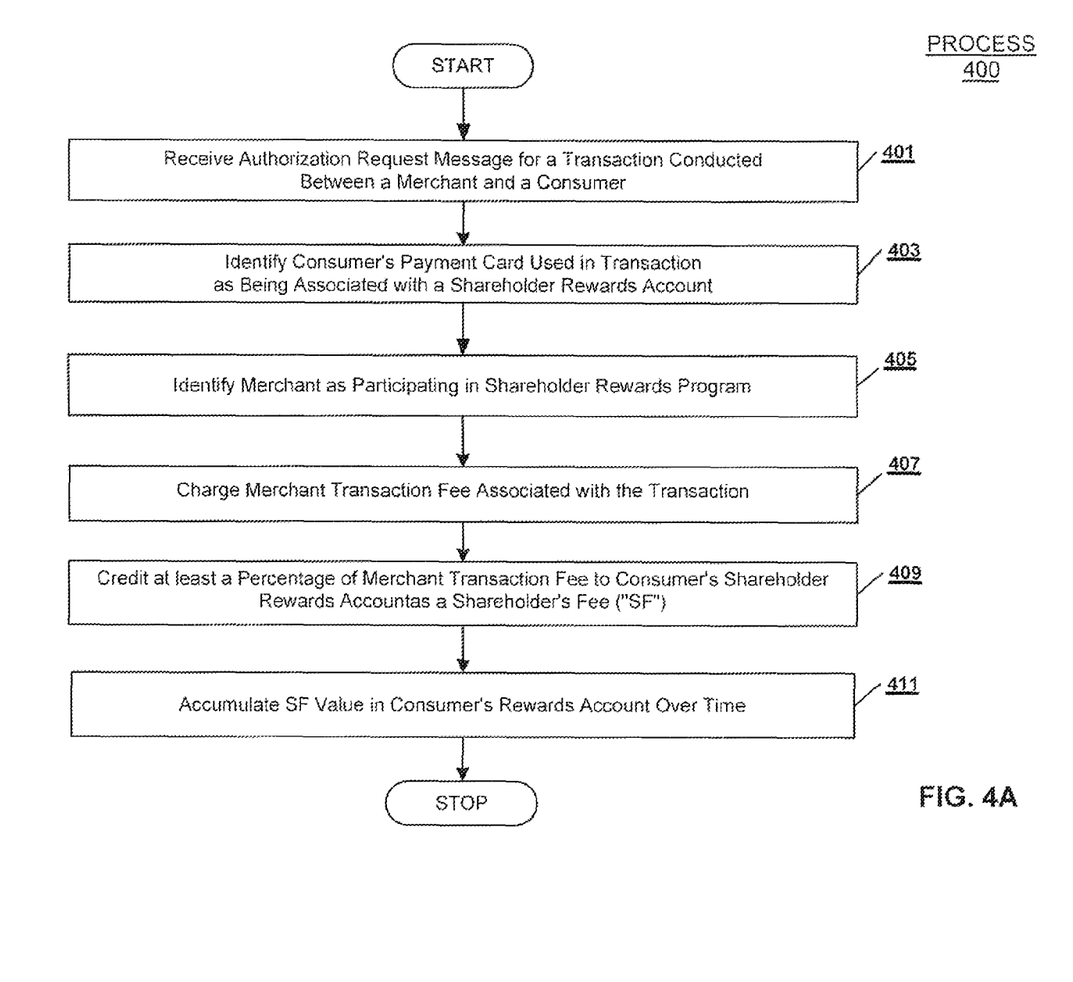
FIG. 4A is a flow chart depicting an example embodiment of a process for implementing a payment card shareholder's reward program.

FIG. 4A is a flow chart depicting an example embodiment of a process for implementing a payment card shareholder's reward program. In the illustrated embodiment, process 400 begins at operation 401 where an authorization request message is received for a transaction conducted between a merchant and a consumer using a payment card or other payment device. The consumer's payment device is associated with an account of the consumer that is issued by an issuer bank. When the authorization request message is received, the payment processing system inspects the message to identify information about the consumer's account and other information. The payment card account is then identified as being associated with the shareholder rewards account at operation 403. In one embodiment, an indication that the consumer's payment card account is associated with a shareholder rewards account is accomplished by comparing the account information contained in the authorization request message with a listing of accounts associated with rewards accounts. The consumer's payment card account information is compared to payment accounts that are associated with a shareholder rewards account. In one embodiment, this comparison is conducted within a shareholder rewards unit of the payment processing system, although it may be performed at other locations or remote locations such as at a database in communication with the payment processing system as well. This listing of accounts can be stored in a database or memory in communication with the payment processing system. In other embodiments, the database or memory can be integrated with the payment processing system.

Process 400 continues at operation 405 where the merchant with whom the consumer is conducting the transaction is identified as participating in the shareholder rewards program. In one embodiment, this is accomplished by accessing a database containing participating merchant information as described above. Once the consumer's account is identified as being associated with a shareholder rewards account and the merchant is identified as participating in the shareholder rewards program, the merchant can be charged a merchant transaction fee associated with the transaction (operation 407) and at least a percentage of the merchant transaction fee can be credited to the consumer's shareholder rewards account as a shareholder fee ("SF") at operation 409. The SF may be assigned a monetary value and this value will accumulate in the consumer's shareholder rewards account over time (operation 411).

Figure 4B:
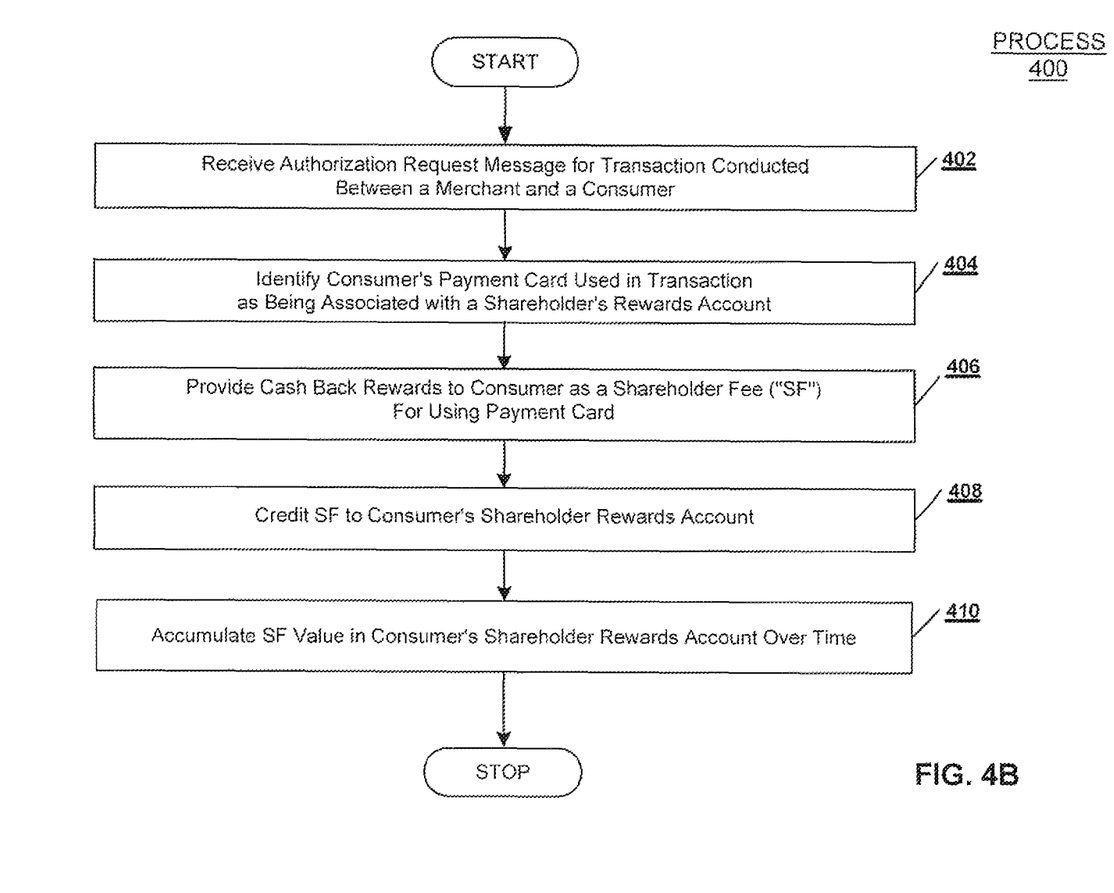
FIG. 4B is a flow chart depicting an example alternate embodiment of a process for implementing a payment card shareholder's reward program.

FIG. 4B is a flow chart depicting an example alternate embodiment of a process for implementing a payment card shareholder's reward program. In the illustrated embodiment, process 400 begins at operation 402 where an authorization request message is received for a transaction conducted between a merchant and a consumer using a payment card or other payment device. The payment card account is then identified as being associated with the shareholder rewards account at operation 404 as described above. In this alternate case, however, the shareholder rewards program provides a cash back award to the consumer's shareholder rewards account from the card issuer instead of or in addition to the SF received from a percentage the merchant's transaction fee (operation 406). This case occurs when the card issuer wants to provide incentives to the consumer for making purchases on the payment card account held by the issuer. The SFs are then credited to the consumer's shareholder rewards account (operation 408) and monetary value associated with the SFs is then accumulated in the consumer's shareholder rewards account over time (operation 410).

Figure 4C:
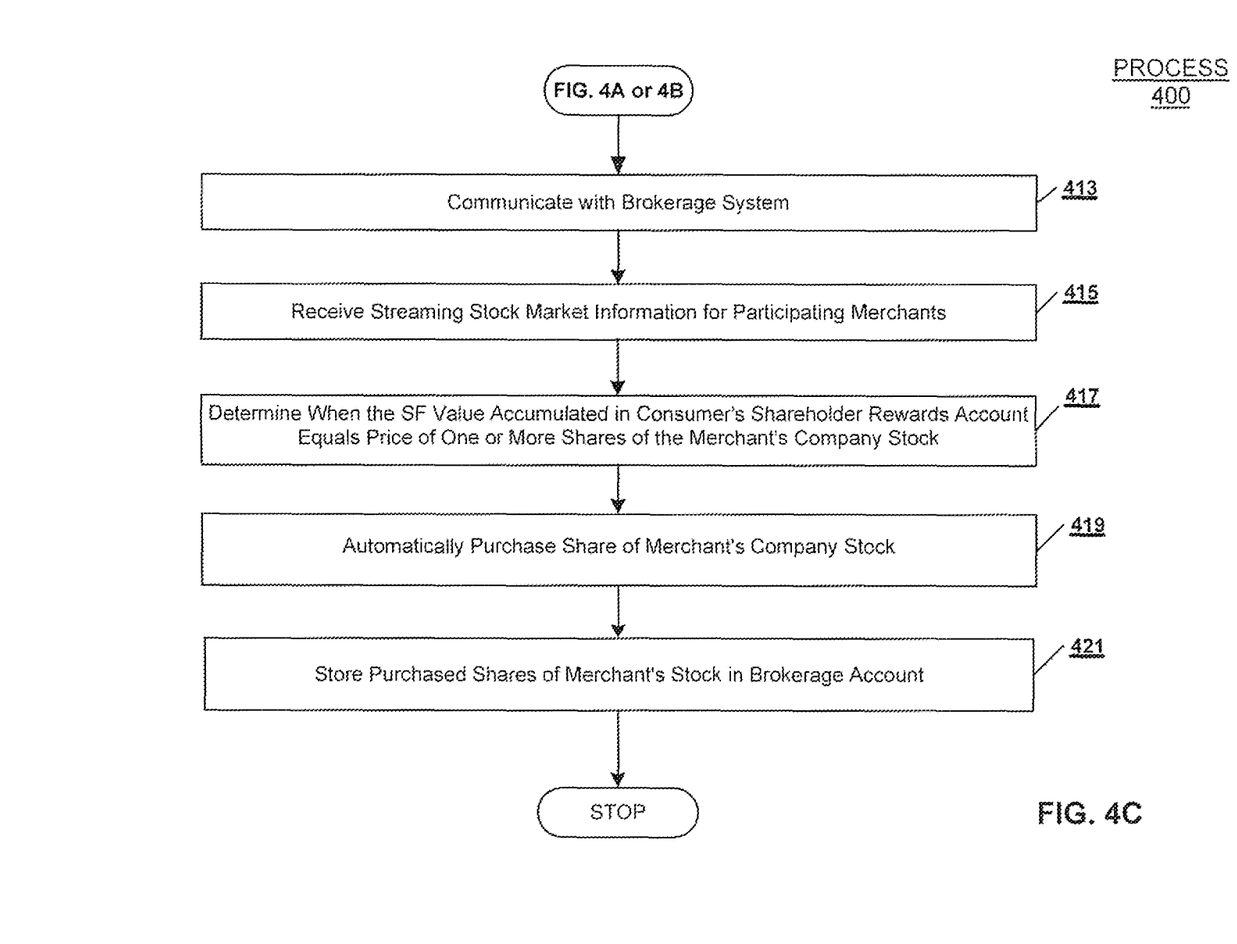
FIG. 4C is a flow chart depicting an example embodiment of a process for implementing a payment card shareholder's reward program.

FIG. 4C is a flow chart depicting an example embodiment of a process for implementing a payment card shareholder's reward program. A brokerage account can be associated with the consumer's shareholder rewards account. In the illustrated embodiment, the payment processing system communicates with a brokerage system associated with the brokerage account of the consumer (operation 413). Real-time streaming market information for merchants participating in the shareholder rewards program can then be received by the payment processing system via the brokerage system (operation 415). Based on this information, one or more shares of stock of a participating merchant can be automatically purchased when it is determined that the value of the SFs accumulated in the consumer's shareholder rewards account equals the price of the stock on the market (operation 417 & 419). The purchased stock can then be stored in the consumer's brokerage account (operation 421).

Figure 4D:
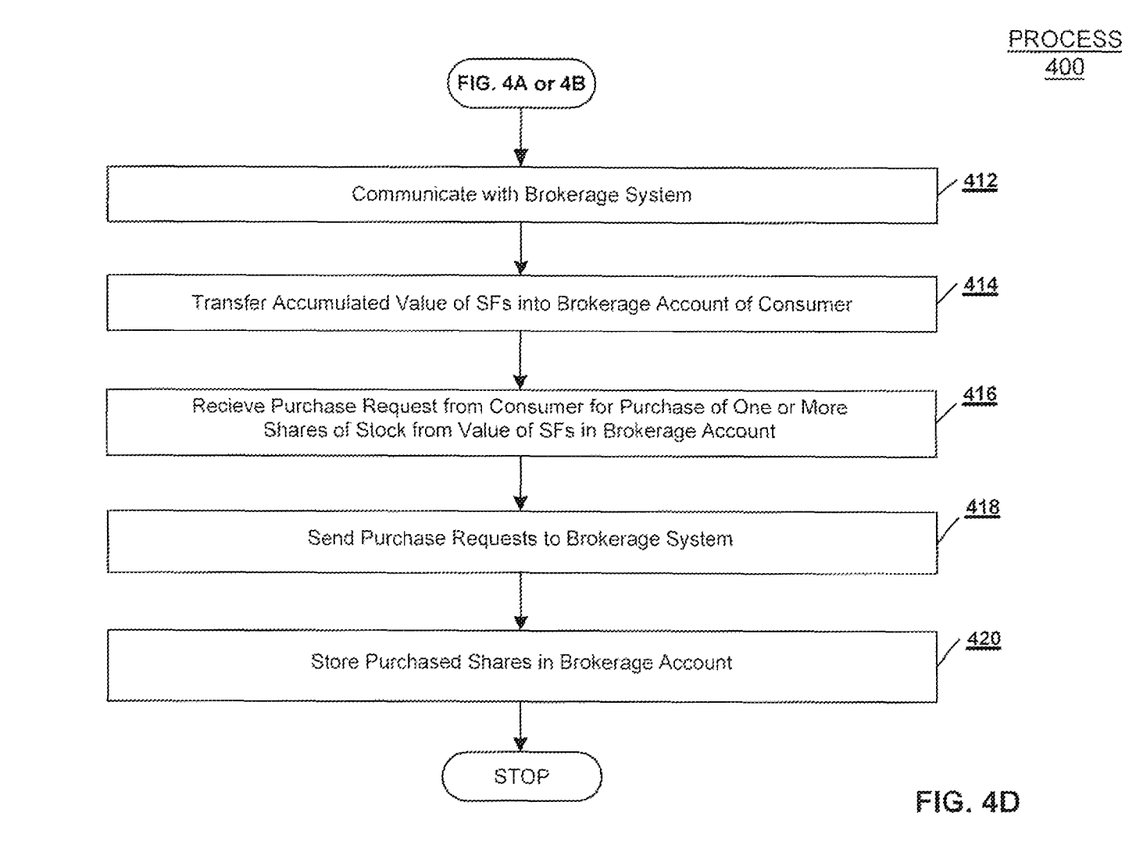
FIG. 4D is a flow chart depicting an example embodiment of a process for implementing a payment card shareholder's reward program.

FIG. 4D is a flow chart depicting an example embodiment of a process for implementing a payment card shareholder's reward program. A brokerage account can be associated with the consumer's shareholder rewards account. In the illustrated embodiment, the payment processing system communicates with a brokerage system associated with the brokerage account of the consumer (operation 412). The accumulated value of the SFs can be transferred into the brokerage account of the consumer via the brokerage system (operation 414). The payment processing system can then receive purchase requests from the consumer for purchase of one or more shares of stock from the value of the SFs in the consumer's brokerage account (operation 416) and send the stock purchase request to the brokerage system for executing the transaction. In an alternate embodiment, the consumer can make the stock purchase requests directly to the brokerage account using the brokerage system. The purchased shares can then be stored in the consumer's brokerage account. In this manner, transactions for the purchase of one or more shares of stock of merchants participating in the shareholder rewards program can be conducting using the monetary value of the SFs accumulated in the consumer's shareholder rewards account via the brokerage system and the associated brokerage account of the consumer.

In one embodiment, the percentage of the transaction fee credited to the consumer's shareholder rewards account is set by the issuer of the account associated with the payment card used in the transaction. In another embodiment, the merchant can set the percentage of the transaction fee credited to the consumer's shareholder rewards account. For instance, the merchant may want to set a percentage of a transaction fee to be paid to a consumer's rewards account based on the total sale price of the transaction or based on a sale or other incentive offered by the merchant to encourage consumer's to conduct business with the merchant.

Merchants may also increase the SFs paid as long as the value of those SFs is only used for purchasing shares of stock of the merchant. Groups of merchants may also do this so that consumers are incentivized to conduct business with that group of merchants or service providers. Some merchants may offer the SFs as a cash back award in the form of SFs that can be used for the purchase of any shares of stock from any merchant using the consumer's brokerage account. Other merchants may require their SF awards only be used for purchasing stock of that merchant or group of merchants. Further, yet other merchants may offer larger cash back awards in the form of SFs for marketing like any sale, or for purchase of that merchant's stock, or any combination of these.

To accomplish this, in one embodiment, separate merchant accounts can be provided for each participating merchant in the consumer's shareholder rewards account such that purchase transactions conducted with that merchant are credited solely to the merchant's separate account. This incentivizes merchants to participate in the program since any rewards paid to consumers will ultimately be used to purchase company stock of the merchant. Separate accounts can also be provided for pools of merchants in the same way.

The embodiments described herein have several advantages. First, the embodiments are advantageous for consumers because consumers can invest in shares of stock in various companies just by using their shareholder rewards card. In addition, the embodiments are advantageous for payment card account issuers to use the program because it encourages consumers to utilize their payment cards for conducting transactions. Finally, the embodiments are advantageous to merchants because consumers are encouraged to transact business with merchants or service providers who are participants in the shareholder rewards program. In addition, when consumers use their SF reward value to purchase stock of the merchants, the merchants ultimately benefit from that long term by increasing the total volume of investors in their stock offerings. Merchants can set the percentage of cash back (SFs) based on the total sale price or a set rate. Receipts can also be issued to consumers at the point of sale saying "you earned $10 cash back towards the purchase of shares of X stock."

The embodiments of the invention described herein relate to an enhancement of current payment card transactions as a new card account to reward consumers with automatic cash back in the form of SFs to be applied toward the purchase of shares of stock in publicly held corporations. SF can be charged to the merchant's account at a suggested automatic rate of, for example ¼ to 1% of the total purchase price or a fixed amount per transaction can be charged. As an additional incentive to the merchant to increase sales, the merchant can choose to increase the SF rate to an even higher rate and advertise this rate to consumers. Much like having a sale, the higher the SF rate of reward, the more likely the consumer will go out of their way to shop at that merchants POS. The SF rewards are paid back to the consumer's shareholder rewards account and can be transferred to the consumer's brokerage account to be invested at a later date. The consumer may also add any additional amount to the consumer's account toward the purchase of shares of stock. Further, merchants choosing to decline accepting payment cards implemented according to the systems and methods described herein can still accept a standard Visa/MasterCard payment portion of the card.

In addition, unincorporated merchants may apply for business relayed funding under the card, Main Street Banking, based on the total volume of unincorporated SFs. In addition, the U.S. Government Tax Revenues will benefit by the increased number of investors' profits to tax.

I. Exemplary Implementations

Embodiments of the present invention may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Figure 5:
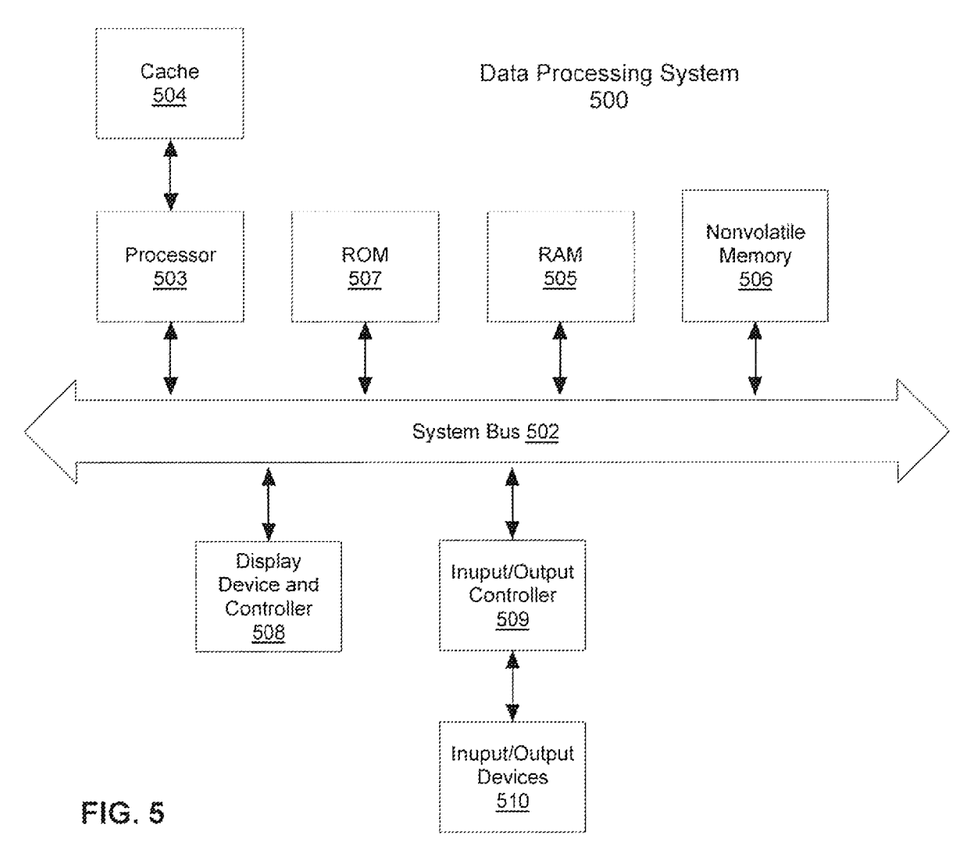
FIG. 5 depicts an example data processing system upon which the embodiments described herein may be implemented.

FIG. 5 depicts one example of a typical data processing system, such as data processing system 500, which may be used to implement the described embodiments. Note that while FIG. 5 illustrates various components of a data processing system, it is not intended to represent any particular architecture or manner of interconnecting the components as such details are not germane to the techniques described herein. It will also be appreciated that network computers and other data processing systems, which have fewer components or perhaps more components, may also be used. The data processing system of FIG. 5 may, for example, a personal computer (PC), workstation, tablet, smartphone or other hand-held wireless device, or any device having similar functionality.

As shown in FIG. 5, the data processing system 501 includes a system bus 502, which is coupled to a processor 503, a Read-Only Memory ("ROM") 507, a Random Access Memory ("RAM") 505, as well as other nonvolatile memory 506, e.g., a hard drive. In the illustrated embodiment, processor 503 is coupled to a cache memory 504. System bus 502 can be adapted to interconnect these various components together and also interconnect components 503, 507, 505, and 506 to a display controller and display device 508, and to peripheral devices such as input/output ("I/O") devices 510. Types of I/O devices can include keyboards, modems, network interfaces, printers, scanners, video cameras, or other devices well known in the art. Typically, I/O devices 510 are coupled to the system bus 502 through I/O controllers 509. In one embodiment the I/O controller 509 includes a Universal Serial Bus ("USB") adapter for controlling USB peripherals or other type of bus adapter.

RAM 505 can be implemented as dynamic RAM ("DRAM"), which requires power continually in order to refresh or maintain the data in the memory. The other nonvolatile memory 506 can be a magnetic hard drive, magnetic optical drive, optical drive, DVD RAM, or other type of memory system that maintains data after power is removed from the system. While FIG. 5 shows that nonvolatile memory 506 as a local device coupled with the rest of the components in the data processing system, it will be appreciated by skilled artisans that the described techniques may use a nonvolatile memory remote from the system, such as a network storage device coupled with the data processing system through a network interface such as a modem or Ethernet interface (not shown).

With these embodiments in mind, it will be apparent from this description that aspects of the described techniques may be embodied, at least in part, in software, hardware, firmware, or any combination thereof. It should also be understood that embodiments could employ various computer-implemented functions involving data stored in a computer system. The techniques may be carried out in a computer system or other data processing system in response executing sequences of instructions stored in memory. In various embodiments, hardwired circuitry may be used independently or in combination with software instructions to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Embodiments herein may also be implemented in computer-readable instructions stored on an article of manufacture referred to as a computer-readable medium, which is adapted to store data that can thereafter be read and processed by a computer. Computer-readable media is adapted to store these computer instructions, which when executed by a computer or other data processing system such as data processing system 500, are adapted to cause the system to perform operations according to the techniques described herein. Computer-readable media can include any mechanism that stores information in a form accessible by a data processing device such as a computer, network device, tablet, smartphone, or any device having similar functionality.

Examples of computer-readable media include any type of tangible article of manufacture capable of storing information thereon including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing instructions in an electronic format. Computer-readable media can also be distributed over a network-coupled computer system stored and executed in a distributed fashion.

It should be understood that the various data processing devices and systems are provided for illustrative purposes only, and are not intended to represent any particular architecture or manner of interconnecting components, as such details are not germane to the techniques described herein. It will be appreciated that network computers and other data processing systems, which have fewer components or perhaps more components, may also be used. For instance, these embodiments may be practiced with a wide range of computer system configurations including any device that can interact with the Internet via a web browser or an application such as hand-held devices, microprocessor systems, workstations, personal computers ("PCs"), Macintosh computers, programmable consumer electronics, minicomputers, mainframe computers, or any mobile communications device including an iPhone, iPad, Android, or Blackberry device, or any device having similar functionality. These embodiments can also be practiced in distributed computing environments where tasks are performed by remote processing devices that are linked through a wire-based or wireless network.

Throughout the foregoing description, for the purposes of explanation, numerous specific details were set forth in order to provide a thorough understanding of the invention. It will be apparent, however, to persons skilled in the art that these embodiments may be practiced without some of these specific details. Accordingly, the scope and spirit of the invention should be judged in terms of the claims that follow as well as the legal equivalents thereof.

What is claimed is:

1. A method for shareholder investment comprising:
   receiving an authorization request message by a payment processing server for a transaction conducted between a merchant and a consumer using a payment card associated with an account of the consumer;
   identifying, by the payment processing server, the consumer's payment card as being associated with a shareholder rewards account of a shareholder rewards program;
   crediting, by the payment processing server, a shareholder fee to the shareholder rewards account based on the transaction conducted by the consumer;
   accumulating monetary value associated with shareholder fees in the shareholder rewards account;
   associating, by the payment processing server, a brokerage account with the shareholder rewards account;
   communicating, by the payment processing server through a network, with a brokerage system wherein the brokerage account is maintained;
   receiving, by the payment processing server, real-time streaming market information from the brokerage system; and
   in response to the receiving of the real-time streaming market information, automatically purchasing one or more shares of stock of the merchant when the monetary value accumulated in the shareholder rewards account for the merchant is equal to a price of the one or more shares of stock.

2. The method of claim 1 further comprising:
   identifying the merchant as participating in the shareholder rewards program by the payment processing server;
   charging the merchant a transaction fee associated with the transaction; and
   crediting at least a percentage of the transaction fee to the shareholder rewards account as a shareholder fee.

3. The method of claim 2 wherein the percentage of the transaction fee credited to the shareholder rewards account is set by an issuer of the account associated with the payment card used in the transaction.

4. The method of claim 2 wherein the percentage of the transaction fee credited to the shareholder rewards account is set by the merchant.

5. The method of claim 2 wherein the percentage of the transaction fee credited to the shareholder rewards account is set by the merchant based on total sale price of the transaction.

6. The method of claim 2 wherein the percentage of the transaction fee credited to the shareholder rewards account is set by the merchant based on a sale offered by the merchant.

7. The method of claim 4 wherein the percentage of the transaction fee credited to the shareholder rewards account set by the merchant is increased for shareholder fees dedicated to the purchase of shares of the merchant's stock.

8. The method of claim 1 further comprising:
   providing separate merchant accounts for each participating merchant in the shareholder rewards account; and
   crediting the shareholder fee solely to the merchant account of the merchant conducting the transaction.

9. The method of claim 1 further comprising:
   providing separate merchant pool accounts for each participating pool of merchants in the shareholder rewards account; and crediting the shareholder fee solely to the merchant pool account associated with the merchant conducting the transaction.

10. The method of claim 1 further comprising:
providing a cash back award to the consumer for using the payment card in the transaction; and
crediting the cash back award to the shareholder rewards account as a shareholder fee.

11. The method of claim 1 further comprising:
transferring the monetary value accumulated in the shareholder account to the brokerage account of the consumer;
receiving a purchase request from the consumer for purchase of one or more shares of stock; and
sending the purchase request to the brokerage system, wherein the brokerage system conducts a transaction for purchase of the requested shares and stores those shares in the brokerage account of the consumer.

12. A shareholder investment system comprising:
a processor;
a memory coupled with the processor;
a network interface configured to receive an authorization request message for a transaction conducted between a merchant and a consumer using a payment card associated with an account of the consumer;
a shareholder rewards unit configured to:
identify the consumer's payment card as being associated with a shareholder rewards account of a shareholder rewards program;
credit a shareholder fee to the shareholder rewards account based on the transaction conducted by the consumer;
accumulate monetary value associated with shareholder fees in the shareholder rewards account;
associate a brokerage account with the shareholder rewards account;
communicate with a brokerage system wherein the brokerage account is maintained;
receive real-time streaming market information from the brokerage system; and
in response to the receipt of real-time streaming market information, automatically purchase one or more shares of stock of the merchant when the monetary value accumulated in the shareholder rewards account for the merchant is equal to a price of the one or more shares of stock.

13. The system of claim 12 wherein the shareholder rewards unit is further configured to:
identify the merchant as participating in the shareholder rewards program by a payment processing server;
charge the merchant a transaction fee associated with the transaction; and
credit at least a percentage of the transaction fee to the shareholder rewards account as a shareholder fee.

14. The system of claim 13 wherein the percentage of the transaction fee credited to the shareholder rewards account is set by an issuer of the account associated with the payment card used in the transaction.

15. The system of claim 13 wherein the percentage of the transaction fee credited to the shareholder rewards account is set by the merchant.

16. The system of claim 13 wherein the percentage of the transaction fee credited to the shareholder rewards account is set by the merchant based on total sale price of the transaction.

17. The system of claim 13 wherein the percentage of the transaction fee credited to the shareholder rewards account is set by the merchant based on a sale offered by the merchant.

18. The system of claim 15 wherein the percentage of the transaction fee credited to the shareholder rewards account set by the merchant is increased for shareholder fees dedicated to the purchase of shares of the merchant's stock.

19. The system of claim 12 wherein the shareholder rewards unit is further configured to:
provide separate merchant accounts for each participating merchant in the shareholder rewards account; and
credit the shareholder fee solely to the merchant account of the merchant conducting the transaction.

20. The system of claim 12 wherein the shareholder rewards unit is further configured to:
provide separate merchant pool accounts for each participating pool of merchants in the shareholder rewards account; and
credit the shareholder fee solely to the merchant pool account associated with the merchant conducting the transaction.

21. The system of claim 12 wherein the shareholder rewards unit is further configured to:
provide a cash back award to the consumer for using the payment card in the transaction; and
credit the cash back award to the shareholder rewards account as a shareholder fee.

22. The system of claim 12 wherein the shareholder rewards unit is further configured to:
transfer the monetary value accumulated in the shareholder account to the brokerage account of the consumer;
receive a purchase request from the consumer for purchase of one or more shares of stock; and
send the purchase request to the brokerage system, wherein the brokerage system conducts a transaction for purchase of the requested shares and stores those shares in the brokerage account of the consumer.

* * * * *